(12) United States Patent
Spigner

(10) Patent No.: US 6,193,377 B1
(45) Date of Patent: Feb. 27, 2001

(54) DUAL REAR VIEW MIRRORS FOR TRUCKS AND OTHER VEHICLES

(76) Inventor: Gary W. Spigner, 117 Lancelot Cir., Prattville, AL (US) 36067

( * ) Notice: Subject to any disclaimer, the term of this patent is extended or adjusted under 35 U.S.C. 154(b) by 0 days.

(21) Appl. No.: 08/164,717

(22) Filed: Dec. 10, 1993

(51) Int. Cl.⁷ .............................. G02B 5/08; G02B 7/182; B60R 1/06

(52) U.S. Cl. .................. 359/602; 359/602; 359/604; 359/605; 359/608; 359/841; 359/865; 359/872; 359/877; 359/881; 248/479; 248/484; 248/486

(58) Field of Search .................. 359/602, 603, 359/604, 605, 607, 608, 841, 850, 855, 864, 865, 872, 877, 881; 248/476, 479, 484, 486

(56) References Cited

U.S. PATENT DOCUMENTS

| | | | | |
|---|---|---|---|---|
| 1,588,673 | * | 6/1926 | Gingrich | 359/608 |
| 2,613,104 | * | 10/1952 | Parsons | 359/903 |
| 2,637,246 | * | 5/1953 | Wolk | 359/608 |
| 2,709,945 | * | 6/1955 | Kuhn | 359/608 |
| 3,132,201 | * | 5/1964 | Bertell et al. | 359/877 |
| 3,263,736 | * | 8/1966 | Macomson | 359/903 |
| 3,476,464 | * | 11/1969 | Clark | 359/865 |
| 3,524,701 | * | 8/1970 | Strohmeier | 359/903 |
| 3,596,079 | * | 7/1971 | Clark et al. | 359/877 |
| 3,830,561 | * | 8/1974 | Laraue et al. | 359/877 |
| 3,977,774 | * | 8/1976 | O'Sullivan | 359/865 |
| 4,253,738 | * | 3/1981 | Linkous | 359/855 |
| 4,283,117 | * | 8/1981 | Ellis | 359/607 |
| 4,504,118 | * | 3/1985 | Harig | 359/865 |
| 4,605,292 | * | 8/1986 | Mciniosh | 359/903 |
| 4,678,294 | * | 7/1987 | Van Nostrand | 359/864 |
| 5,107,375 | * | 4/1992 | Fisher | 359/865 |

FOREIGN PATENT DOCUMENTS

| | | | | |
|---|---|---|---|---|
| 0475437 | * | 7/1951 | (CA) | 359/855 |
| 0120430 | * | 9/1981 | (JP) | 359/865 |

* cited by examiner

Primary Examiner—Ricky D. Shafer

(57) ABSTRACT

A dual rear view mirror assembly for trucks and other vehicles comprising a bracket assembly having an upper portion and a lower portion, each bracket portion having an inboard end adapted to be attached to a truck and like vehicles forwardly of the driver and to one side thereof, each bracket portion having an outboard end with attachment mechanisms, an inboard first mirror having a supporting strip on its upper edge, lower edge and inboard edge, the supporting strip including adjustable support means coupled to the bracket assembly for allowing the adjustment of the first mirror at its inboard end about a vertical axis, and an outboard second mirror having a supporting strip on its upper edge, lower edge and outboard edge, the inboard edge of the second mirror being located adjacent to the outboard edge of the first mirror, and adjustment means coupling the first mirror and second mirror about a vertical axis extending through the line of coupling between the first and second mirrors whereby the second mirror may be adjusted with respect to the first mirror independent of the adjustment of the first mirror with respect to the brackets.

2 Claims, 4 Drawing Sheets

DUAL REAR VIEW MIRRORS FOR TRUCKS AND OTHER VEHICLES

BACKGROUND OF THE INVENTION

1. Field of the Invention

The present invention relates to dual rear view mirrors for trucks and other vehicles and more particularly pertains to expanding the view of drivers through two part rear view mirrors.

2. Description of the Prior Art

The use of mirrors for trucks and other vehicles is known in the prior art. More specifically, rear view mirrors heretofore devised and utilized for the purpose of expanding the view are known to consist basically of familiar, expected, and obvious structural configurations, notwithstanding the myriad of designs encompassed by the crowded prior art which has been developed for the fulfillment of countless objectives and requirements.

The prior art disclosed a large number of patents directed to rear systems for use in trucks and other vehicle. By way of example, U.S. Pat. Nos. 4,049,228 to Skewis; and 4,941,638 to DiSalbatore disclose planar mirror adjustable for use with trucks in identifying blind spots.

U.S. Pat. No. 5,124,847 to Gong disclosed a rear view mirror which is extensible in a common plan.

U.S. Pat. Nos. 3,741,633 to Haley and 4,182,552 to Feinbloom disclose rear view mirrors including plural reflective surfaces.

In this respect, the dual rear view mirrors for trucks and other vehicles according to the present invention substantially departs from the conventional concepts and designs of the prior art, and in doing so provides an apparatus primarily developed for the purpose of expanding the view of drivers through two part rear view mirrors.

Therefore, it can be appreciated that there exists a continuing need for new and improved dual rear view mirrors for trucks and other vehicles which can be used for expanding the view of drivers through two part rear view mirrors. In this respect, the present invention substantially fulfills this need.

SUMMARY OF THE INVENTION

In view of the foregoing disadvantages inherent in the known types of rear view mirrors now present in the prior art, the present invention provides improved dual rear view mirrors for trucks and other vehicles. As such, the general purpose of the present invention, which will be described subsequently in greater detail, is to provide new and improved dual rear view mirrors for trucks and other vehicles and method which has all the advantages of the prior art and none of the disadvantages.

To attain this, the present invention essentially comprises a new and improved dual rear view mirror system for trucks and other vehicles comprising, in combination, a bracket assembly having an upper portion and a lower portion, each bracket portion having an inboard end adapted to be attached to a truck and like vehicles forwardly of the driver and to one side thereof, each bracket portion having an outboard end with attachment mechanisms; an inboard first mirror having a supporting strip on its upper edge, lower edge and inboard edge, the supporting strip including adjustable support means coupled to the bracket assembly for allowing the adjustment of the first mirror at its inboard end about a vertical axis, an outboard second mirror having a supporting strip on its upper edge, lower edge and outboard edge, the inboard edge of the second mirror being located adjacent to the outboard edge of the first mirror, adjustment means coupling the first mirror and second mirror about a vertical axis extending through the line of coupling between the first and second mirrors whereby the second mirror may be adjusted with respect to the first mirror independent of the adjustment of the first mirror with respect to the brackets, an adjustment mechanism in the form of an operator controlled motor located in the region beneath the axis between the first and second mirrors, the motor having an output end adapted to adjust the second mirror about the axis with respect to the first mirror, the motor having an input end operable under the control of a user to allow rotation movement of the motor in either direction for the adjustment of the angular orientation of the second mirror with respect to the first mirror, and a tinted lens positionable over each of the mirrors for abating the glare of sun light and bright head lights and with magnets releasably coupling the lenses to the mirrors.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide new and improved dual rear view mirrors for trucks and other vehicles which have all the advantages of the prior art rear view mirrors and none of the disadvantages.

It is another object of the present invention to provide new and improved dual rear view mirrors for trucks and other vehicles which may be easily and efficiently manufactured and marketed.

It is further object of the present invention to provide new and improved dual rear view mirrors for trucks and other vehicles which are of durable and reliable constructions.

An even further object of the present invention is to provide new and improved dual rear view mirrors for trucks and other vehicles which are susceptible of a low cost of manufacture with regard to both materials and labor, and which accordingly are then susceptible of low prices of sale to the consuming public, thereby making such dual rear view mirrors for trucks and other vehicles economically available to the buying public.

Still yet another object of the present invention is to provide new and improved dual rear view mirrors for trucks and other vehicles which provide in the apparatuses and methods of the prior art some of the advantages thereof, while simultaneously overcoming some of the disadvantages normally associated therewith.

Lastly, it is an object of the present invention to provide a dual rear view mirror assembly for trucks and other vehicles comprising a bracket assembly having an upper portion and a lower portion, each bracket portion having an inboard end adapted to be attached to a truck and like vehicles forwardly of the driver and to one side thereof, each bracket portion having an outboard end with attachment mechanisms, an inboard first mirror having a supporting strip on its upper edge, lower edge and inboard edge, the supporting strip including adjustable support means coupled to the bracket assembly for allowing the adjustment of the first mirror at its inboard end about a vertical axis, and an outboard second mirror having a supporting strip on its upper edge, lower edge and outboard edge, the inboard edge of the second mirror being located adjacent to the outboard edge of the first mirror, and adjustment means coupling the first mirror and second mirror about a vertical axis extending through the line of coupling between the first and second mirrors whereby the second mirror may be adjusted with respect to the first mirror independent of the adjustment of the first mirror with respect to the brackets.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
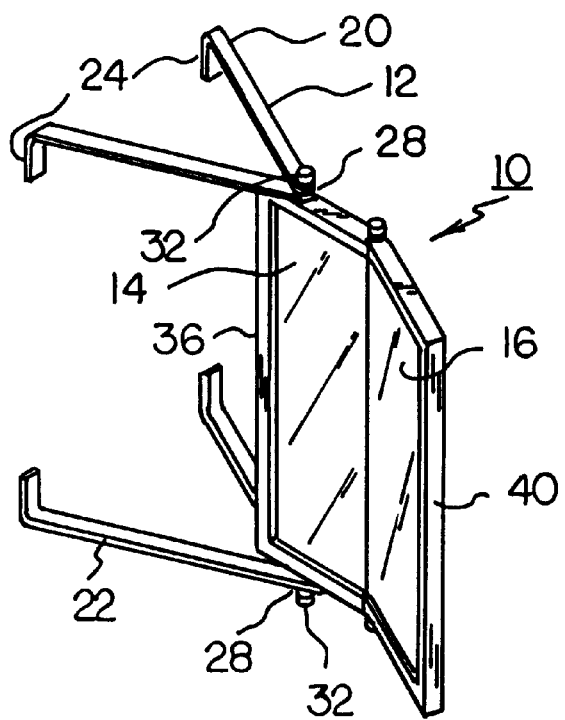
FIG. 1 is a perspective view of the preferred embodiment of the dual rear view mirror system for trucks and other vehicles constructed in accordance with the principles of the present invention.

With reference now to the drawings, and in particular to FIG. 1 thereof, the preferred embodiment of the new and improved dual rear view mirrors for trucks and other vehicles embodying the principles and concepts of the present invention and generally designated by the reference numeral 10 will be described.

Figure 2:
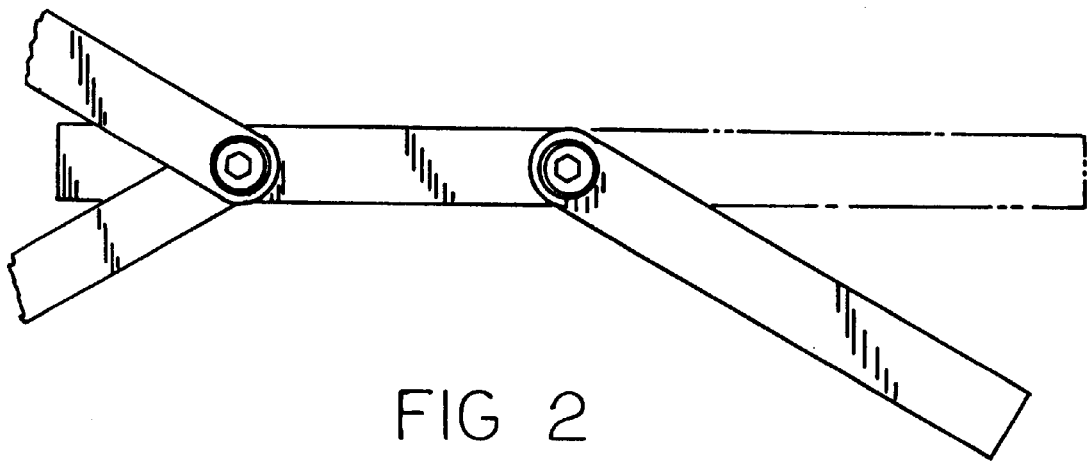
FIG. 2 is a plan view of the mirror system as shown in FIG. 1.
Figure 3:
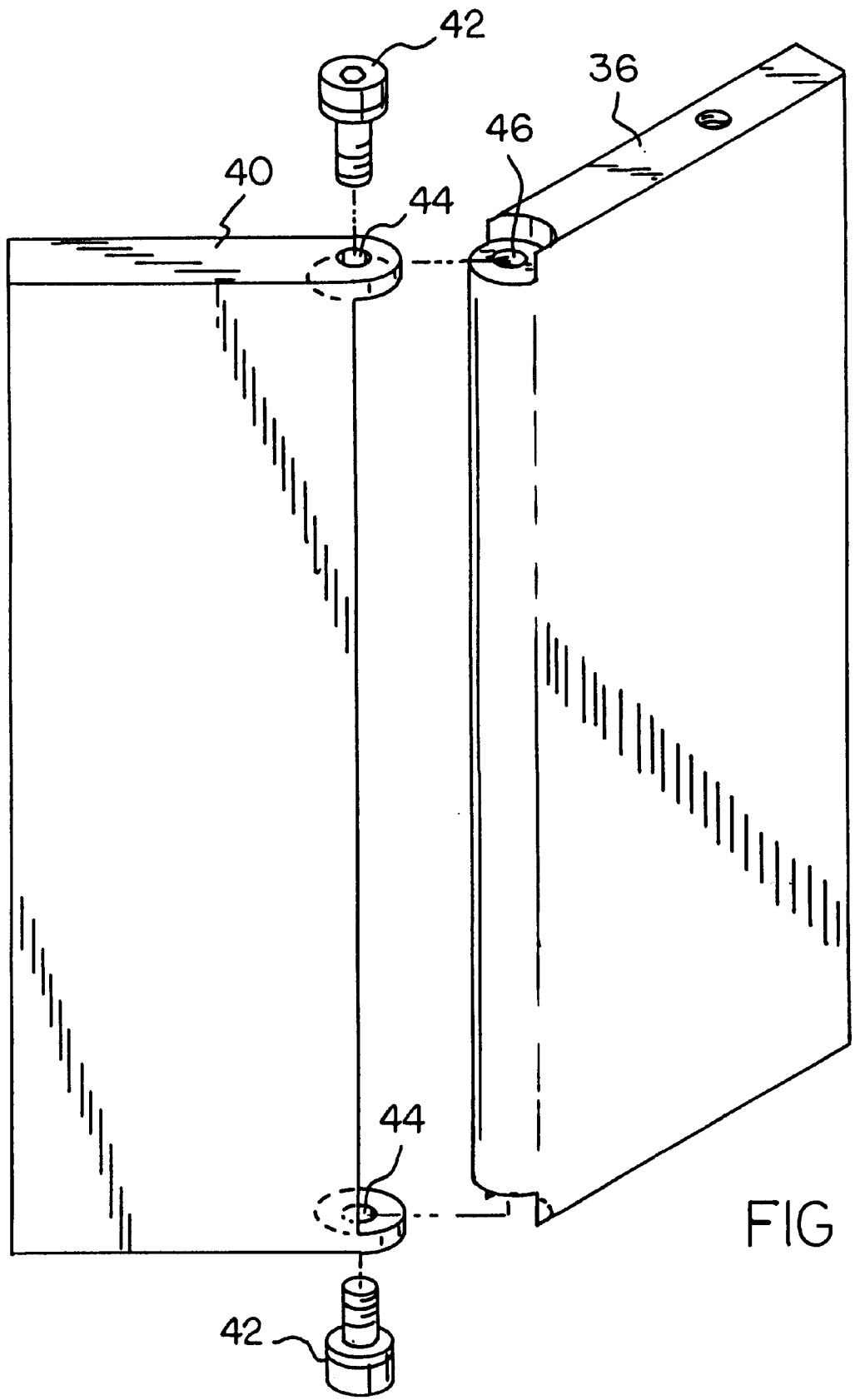
FIG. 3 is an exploded perspective back view of the mirror system of the prior Figures illustrating the coupling between the mirrors.

More specifically, it will be noted that FIGS. 1 through 3 illustrate a new and improved dual rear view mirror assembly 10. Such assembly is for trucks and other vehicles. In its most basic of terms, the assembly 10 comprises a supporting bracket 12, a first or inboard mirror 14, a second or outboard mirror 16 and coupling components there between.

More specifically, the first component is a bracket assembly 12. The bracket assembly has an upper portion 20 and a lower portion 22. Each bracket assembly also has an inboard portion 24 adapted to be attached to a truck, now shown, like vehicle at a location forwardly of the driver and to one side thereof. Each bracket assembly also has an outboard edge 28 with attachment mechanisms in the form of screws 32. The screws 32 extend through apertures in the outboard ends of the bracket assembly into threaded apertures in the adjacent mirror to form an adjustable coupling therebetween.

The next major component of the system is first or inboard mirror 14. Such mirror has a supporting bracket 36 on its upper edge, lower edge and inboard edge. The support bracket 36 includes adjustable support means in the form of threaded apertures aligned with apertures of the bracket assembly for receiving screws 32. This is for allowing the adjustment of the first mirror about its inboard end with respect to the bracket assembly and vehicle about a vertical axis.

A second mirror 16 is next provided, like the first mirror. It has a supporting bracket 40 adjacent its upper edge, lower edge and outboard edge. The inboard edge of the second mirror is located adjacent to the outboard edge of the first mirror.

Next provided are adjustment means to couple the first mirror and second mirror about a vertical axis. Such vertical axis extends through the line of coupling between the first and second mirrors. In this manner, the second mirror may be adjusted with respect to the first mirror independent of the adjustment of the first mirror with respect to the brackets.

Such adjustment means is in the form of screws 42. The screws 42 extend through apertures 44 in the bracket 40 of the second mirror into threaded apertures 46 in the bracket 36 of the first mirror for the adjustable coupling therebetween.

Figure 4:
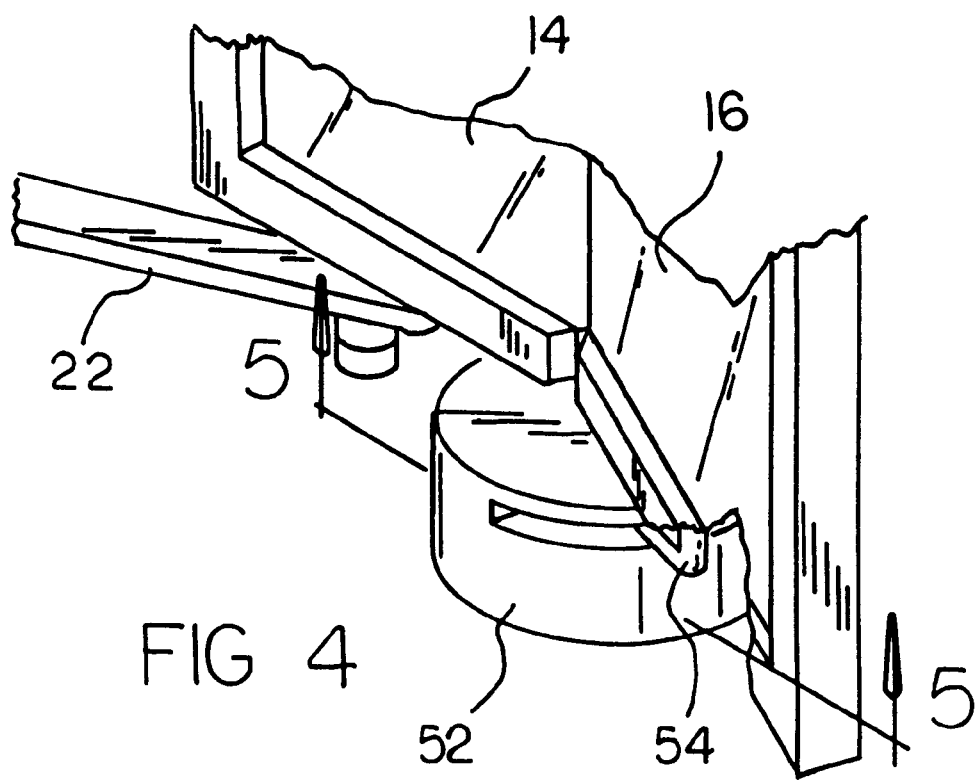
FIG. 4 is a perspective illustration of the lower portion of the mirror system of the prior Figures but constructed in accordance with an alternate embodiment of the invention.
Figure 5:
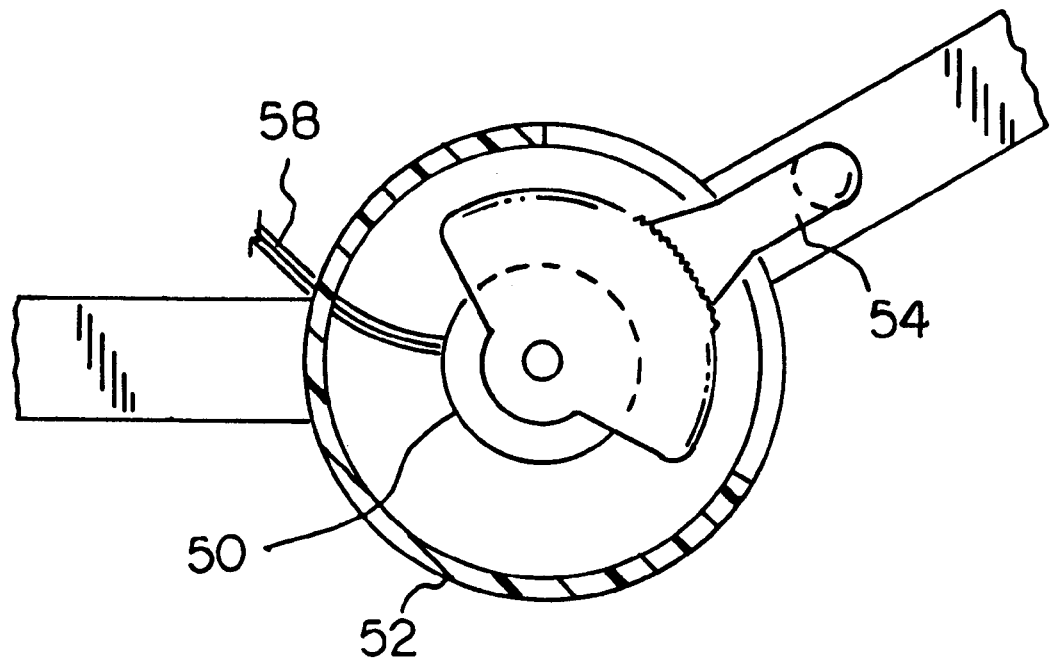
FIG. 5 is a sectional view of the system of FIG. 4 taken along 5—5 of FIG. 4.

FIGS. 4 and 5 show an alternate embodiment of the invention. In such embodiment an adjustment mechanism is provided in the form of an operator controlled motor 50. Such motor 50 is located in a housing 52 region beneath the pivot point between the first and second mirrors. The motor 50 has an output end 54 coupled to, and adapted to adjust, the second mirror 16 with respect to the first mirror 14 about a vertical axis.

The motor 50 also has an input end 56 operable under the control of a user to automatically allow adjustment of the angular orientation of the second mirror 16 with respect to the first mirror 14. Electrical lines 58 lead to controlling mechanisms within the vehicle.

Figure 6:
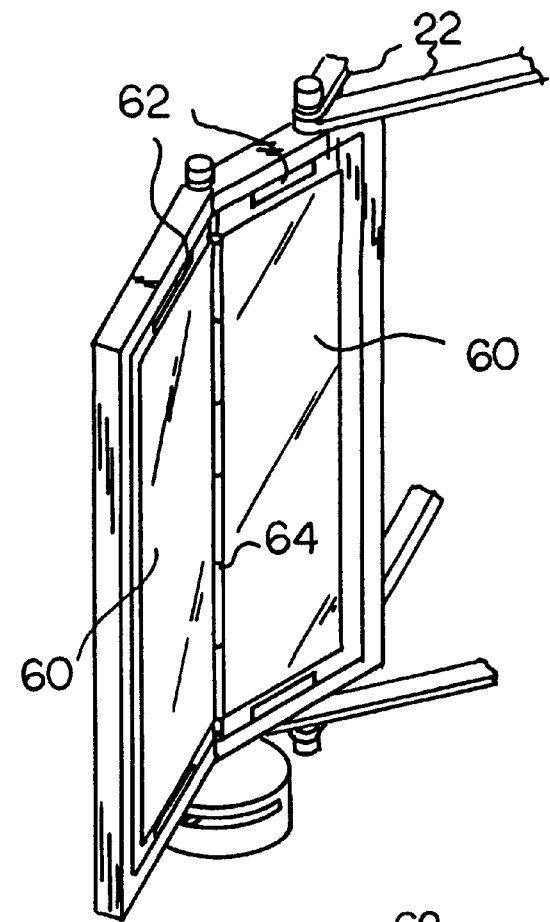
FIG. 6 is a perspective view of a dual rear view mirror assembly for trucks and other vehicles constructed in accordance with another alternate embodiment of the invention.
Figure 7:
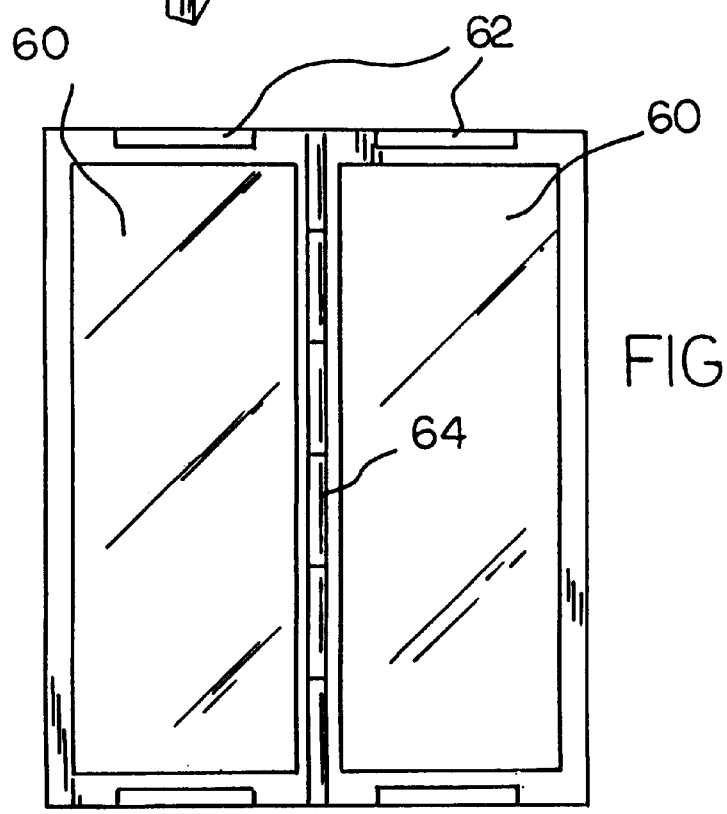
FIG. 7 is a front elevational view of the device as shown in FIG. 6.

Lastly, FIGS. 6 and 7 show another alternate embodiment of the invention. Such embodiment features tinted lens 60 which are positioned over the mirrors 14 and 16. Such lenses function for abating the glare of sun light and bright head lights, magnets 62 releasably couple the lenses and the mirrors. The lenses 60 are in two parts corresponding in size to the mirrors they cover. A piano hinge 64 couples the lenses for pivoting with the pivoting of the mirrors.

Truckers often have a problem seeing behind their rigs. This is due to the design of the outside mirrors and the fact that most of them can only adjusted to permit viewing a selected area of road. When passing other vehicles, it is vital to be able to view the other lane to tell if the left lane is clear so that the vehicle can be pulled out into the lane for passing a slower vehicle. After the slower vehicle is overtaken, the passing driver must be able to see the right lane in order to tell if the passed vehicle is far enough behind to pull back into the other lane.

The present invention is a mirror that can be adjusted to permit easy viewing behind the vehicle and also to the lanes on each side. The mirror assembly consists of two section. These are rectangular in shape and arranged side by side to form a larger rectangle. The section closest to the vehicle, the inboard section, is fixed to the base assembly. It can be adjusted in the normal fashion and secured in the preferred position. The second section, the out board section, can be pivoted independently of the first. This permits it to be adjusted to view an area distinct from the other mirror. The adjustment c..n be done either manually or electrically with a small electric motor and gear assembly. The present invention assembly replaces the original mirror assembly without alteration to the original mounting hardware. It will be greatly appreciated by truckers and anyone else who spends time on the road.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A dual rear view mirror system wherein the improvement comprises:

a bracket assembly having an upper portion and a lower portion, each bracket portion having an inboard end adapted to be attached to a vehicle forwardly of the driver and to one side thereof, each bracket portion having an outboard end with attachment mechanisms;

an inboard first mirror having a supporting strip on its upper edge, lower edge and inboard edge, the supporting strip including adjustable support means coupled to the bracket assembly for allowing the adjustment of the first mirror at its inboard end about a vertical axis;

an outboard second mirror having a supporting strip on its upper edge, lower edge and outboard edge, the inboard edge of the second mirror being located adjacent to the outboard edge of the first mirror;

adjustment means coupling the first mirror and second mirror about a vertical axis extending through a line of coupling between the first and second mirrors whereby the second mirror can be adjusted with respect to the first mirror independent of the adjustment of the first mirror with respect to the brackets;

an adjustment mechanism in the form of an operator controlled motor located in the region beneath the axis between the first and second mirrors, the motor having an output end adapted to adjust the second mirror about the axis with respect to the first mirror, the motor having an input end operable under the control of a user to allow rotational movement of the motor in either direction for the adjustment of the angular orientation of the second mirror with respect to the first mirror; and a tinted lens positionable over each of the mirrors for abating glare from sun light and bright head lights and with magnets releasably coupling the lenses to the mirrors.

2. A dual rear view mirror assembly wherein the improvement comprises:

a bracket assembly having an upper portion and a lower portion, each bracket portion having an inboard end adapted to be attached to a vehicle forwardly of the driver and to one side thereof, each bracket portion having an outboard end with attachment mechanisms;

an inboard first mirror having a supporting strip on its upper edge, lower edge and inboard edge, the supporting strip including adjustable support means coupled to the bracket assembly for allowing the adjustment of the first mirror at its inboard end about a vertical axis;

an outboard second mirror having a supporting strip on its upper edge, lower edge and outboard edge, the inboard edge of the second mirror being located adjacent to the outboard edge of the first mirror;

adjustment means coupling the first mirror and second mirror about a vertical axis extending through a line of coupling between the first and second mirrors whereby the second mirror can be adjusted with respect to the first mirror independent of the adjustment of the first mirror with respect to the brackets; and an adjustment mechanism in the form of an operator controlled motor located in the region beneath the axis between the first and second mirrors, the motor having an output end adapted to adjust the second mirror about the axis with respect to the first mirror, the motor having an input end operable under the control of a user to allow rotational movement of the motor in either direction for the adjustment of the angular orientation of the second mirror with respect to the first mirror.

* * * * *